> United States Patent Office 3,598,826
Patented Aug. 10, 1971

3,598,826
PRODUCTION OF 1,1'-ETHYLENE-1,1',2,2'-
TETRAHYDRO-2,2'-BIPYRIDYL
John Francis Cairns and John Anthony Corran, Runcorn,
England, assignors to Imperial Chemical Industries
Limited, London, England
No Drawing. Filed Sept. 26, 1968, Ser. No. 763,002
Claims priority, application Great Britain, Oct. 10, 1967,
45,542/67
Int. Cl. C07d 51/64
U.S. Cl. 260—268                                    2 Claims

ABSTRACT OF THE DISCLOSURE 1,1'-ethylene-1,1',2,2'-tetrahydro - 2,2' - bipyridyls, useful as intermediates for the manufacture of herbicides, as prepared by the reduction of ethylene-bis-pyridinium salts.

---

This invention relates to 1,1'-ethylene-1,1',2,2'-tetrahydro-2,2'-bipyridyls and to processes for their manufacture.

According to our invention we provide 1,1'-ethylene-1,1',2,2'-tetrahydro-2,2'-bipyridyls and in particular 1,1'-ethylene-1,1',2,2'-tetrahydro-2,2'-bipyridyl itself.

The pyridine rings in the tetrahydrobipyridyl may be unsubstituted or may carry inert substituents, for example alkyl groups, and in particular methyl or ethyl groups on one or more of the 3,3',4,4',5,5',6 or 6' positions. The two carbon atoms of the ethylene group may each carry hydrogen atoms and/or inert substituents, for example alkyl groups and in particular methyl or ethyl groups.

According to our invention we also provide a process for the manufacture of 1,1'-ethylene-1,1',2,2'-tetrahydro-2,2'-bipyridyl which comprises reducing a corresponding ethylene-bis-pyridinium salt.

The ethylene-bis-pyridinium salt may be in particular a salt of a strong acid, for example a halide (especially a chloride or a bromide), a sulphate, a chlorate or a perchlorate. Ethylene-bis-pyridinium salts may be made in conventional manner for example by interacting an ethylene dihalide and in particular an ethylene dibromide with a pyridine.

The reduction is preferably carried out in an aqueous medium and advantageously in the presence of an organic solvent, which is preferably one which is immiscible with the aqueous medium and is not affected itself by the reductive process and may be in particular a hydrocarbon or an ether, for example benzene, toluene, xylene, trimethyl benzenes, hexane, cyclohexane, iso-octane, n-decane, petroleum ether or other petroleum fractions, diethyl ether, di-n-propyl ether, dibutyl Carbitol, or mixtures thereof. It is also possible to use other water-immiscible organic solvents even if they have some possibility of reacting (for example by being reduced), provided that such side reaction does not either interfere with the course of the desired reduction of the pyridinium salt or produce by-products which interfere with the isolation or recovery of the desired tetrahydrobipyridyl product. Mixtures of solvents may also be used if desired. The main consideration for choice is usually the boiling point of the solvent, which should be convenient for the operation to be carried out. It is advantageous for the solvent to have a specific gravity less than 1, as this aids separation of the organic solvent phase (containing the product) from the aqueous phase after reaction.

The reduction may be carried out by means of a suitable chemical reducing agent, for example an active metal and in particular an alkali metal, magnesium, calcium or aluminium. We have found it convenient to carry out the reduction by means of an alkali metal amalgam, particularly sodium amalgam, and for this purpose it is more convenient to use an amalgam which is liquid. The reaction may be carried out by agitating the mixture of aqueous pyridinium salt solution, amalgam, and the organic solvent until reaction has proceeded to the desired degree after which the mixture can be allowed to settle, and the organic solvent phase containing the tetrahydrobipyridyl product can be separated. The mercury (i.e. spent amalgam) phase can also be recovered for re-use.

Alternatively the reduction can be carried out electrolytically. High yields and current efficiencies may be obtained by using neutral or alkaline aqueous solutions of the ethylene-bis-pyridinium salt as electrolyte and maintaining the cathode potential within ±0.2 volt of the polarographic half-wave potential for the reduction of the particular ethylene-bis-pyridinium salt used. In the case of the reduction of unsubstituted ethylene-bis-pyridinium salts it is preferred to maintain the cathode potential in the range $-1.06 \pm 0.2$ volt with reference to a saturated calomel electrode. Complete conversion of the ethylene - bis - pyridinium salt to the tetrahydrobipyridyl derivative can be achieved, without reduction in the current efficiency, if the current is reduced during the course of the electrolysis at a rate such as to maintain the potential in the desired range. The addition of a salt which has a high conductance in solution, for example sodium chloride, to the electrolyte, improves the conductivity of the electrolyte and decreases the specific electrical energy consumption (kilowatt-hours per unit of tetrahydrobipyridyl produced) for the electrolysis.

The cathode material may be conveniently mercury, though other metals, preferably of high hydrogen overpotential (for example copper or lead) may also be used.

The concentration of the ethylene-bis-pyridinium salt in the aqueous solutions used in these reduction procedures may be any convenient concentration up to saturation level, though we prefer not to use very dilute solutions. When additional salts are added to the solution, as for example to improve the conductivity for the electrolytic reduction, allowance should be made for the fact that a high concentration of ethylene-bis-pyridinium salt may reduce the solubility of the salts being added. Accordingly, the optimum concentrations of both ethylene-bis-pyridinium salt and additive salts are inter-related and we prefer that the concentration of salts other than the ethylene-bis-pyridinium salt are kept below 5 molar concentration.

The reduction may be carried out at a variety of temperatures, though it is preferred to use a temperature at which the tetrahydrobipyridyl product (which may in some circumstances be an unstable compound) is not decomposed to any troublesome extent. In general, a temperature in the range approximately 20° to 30° C. is very convenient. It is also desirable, because of the possible instability of the product, to carry out the reduction under an inert atmosphere, for example of nitrogen or argon.

The compounds of this invention are useful as intermediates, for example for the production of the corresponding bipiperidyl and are especially useful for conversion by oxidation into the corresponding N,N'-ethylene-2,2'-bipyridylium salts, of value as herbicides.

The invention is illustrated but not limited by the following examples in which the parts and percentages are by weight. The reaction described in these examples were carried out under high purity nitrogen and nitrogen was passed through the solvents and solutions to remove air before the solvents and solutions were used.

EXAMPLE 1

Ethylene-bis-pyridinium bromide (2.208 grams dissolved in 10 ml. of water) was added, drop-wise over a period of about 30 minutes to a stirred mixture of sodium amalgam (10 ml. containing about 0.45 percent of sodium) and cyclohexane (20 ml. spectroscopic grade). During the reaction the cyclohexane became yellow. After all the ethylene-bis-pyridinium bromide had been added the cyclohexane layer was separated, dried over anhydrous magnesium sulphate and filtered, some brown material being left on the filter. The filtrate was evaporated to dryness and allowed to stand under vacuum for a period of about 30 minutes. The dark brown residue remaining after removal of the solvent from the filtrate weighed 0.825 gram which corresponds to a yield of about 70% of 1,1'-ethylene-1,1',2,2'-tetrahydro-2,2'-bipyridyl.

EXAMPLE 2

The procedure of Example 1 was repeated using 2.288 grams of ethylene-bis-pyridinium bromide and the cyclohexane solution produced by the reduction was filtered through a sintered glass filter, which had been thoroughly purged with nitrogen, giving a filtrate of a clean yellow colour. When a portion of this filtrate was exposed to the atmosphere a dark brown solid was rapidly deposited. This solid was soluble in water, but insoluble in acetone and ethane. The solution in cyclohexane had a characteristic smell very similar to that of 1,1'-dimethyl-1,1',4,4'-tetrahydro-4,4'-bipyridyl.

A sample of the solution in cyclohexane was submitted to mass spectroscopic analysis and the spectrum showed a parent molecular ion with m/e—186 corresponding to an ethylenetetrahydrobipyridyl and having a fragmentation pattern consistent with the structure of 1,1'-ethylene-1,1'-2,2'-tetrahydro-2,2'-bipyridyl.

A second sample of the solution was submitted to nuclear magnetic resonance analysis, under nitrogen. This analysis showed a structure consistent with that of 1,1'-ethylene-1,1',2,2'-tetrahydro-2,2'-bipyridyl, but not consistent with that of a tetrahydro-3,3'- or 4,4'-bipyridyl.

EXAMPLE 3

The procedure of Example 1 was repeated using 2.01 g. of ethylene-bis-pyridinium bromide, but with potassium amalgam as reducing agent and toluene as organic solvent. The yield of 1,1'-ethylene-1,1'-2,2'-tetrahydro-2,2'-bipyridyl was 55%.

We claim:
1. A process for the manufacture of 1,1'-ethylene-1,1', 2,2'-tetrahydro-2,2'-bipyridyl which consists of reducing a corresponding ethylene-bis-pyridinium salt with an alkali metal amalgam or an alkaline earth amalgam in the presence of an aqueous medium.
2. A process as claimed in claim 1 which is carried out in presence of a water-immiscible organic solvent.

References Cited

UNITED STATES PATENTS

| 3,478,042 | 11/1969 | Colchester et al. | 260—296 |
| 3,491,104 | 1/1970 | Colchester et al. | 260—296 |

FOREIGN PATENTS

| 1,078,846 | 8/1967 | Great Britain | 260—296 |
| 1,073,082 | 6/1967 | Great Britain | 260—296 |

ALAN L. ROTMAN, Primary Examiner

U.S. Cl. X.R.

260—296; 71—92